April 15, 1958
E. D. STORY ET AL
2,830,624
COIL HOLDER FOR GROUP WINDING HEADS
Filed June 14, 1954
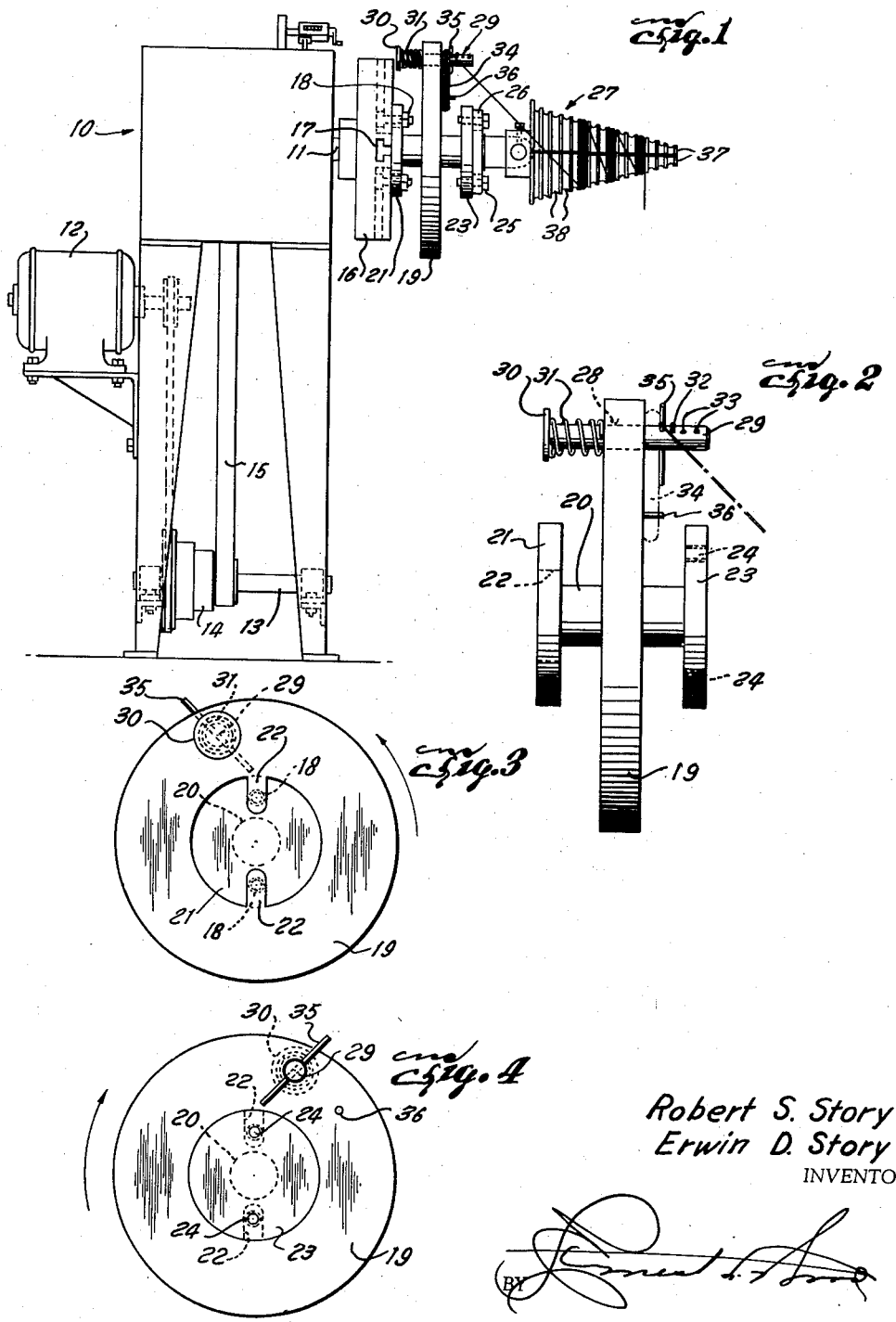
Robert S. Story
Erwin D. Story
INVENTORS
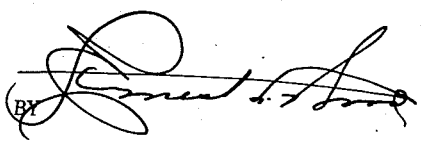
ATTORNEY United States Patent Office 2,830,624
Patented Apr. 15, 1958

2,830,624

COIL HOLDER FOR GROUP WINDING HEADS

Erwin D. Story and Robert S. Story, Dallas, Tex.

Application June 14, 1954, Serial No. 436,402

3 Claims. (Cl. 140—92.2)

This invention relates to machines for winding motor and generator coils and it has particular reference to a coil holding attachment for group winding heads.

Coil winding heads are currently in use on which coils are successively wound without the necessity of cutting the wire. Other winding heads are at present employed for winding individual coils of various sizes which require cutting of the wire at the completion of each coil and which necessitates the removal of insulation from the ends of the wire and the soldering of the ends together when the coils are installed in the electrical equipment for which they were wound. In neither case is there provided a medium by which the completed coils may be held during the winding of companion coils, thus to facilitate the coil winding procedure.

It is, therefore, the principal object of the present invention to provide a coil holder adapted to function in conjunction with a conventional group winding head for receiving the coils as they are completed and removed from the head.

Another object of the invention is to provide a coil holder whose use obviates the necessity for cutting the wire between coils.

Still another object of the invention is to provide a coil holder designed to be mounted on the head stock spindle of a lathe or coil winding machine in such manner that it will not interfere with normal use of the conventional winding head yet will function in conjunction therewith when needed.

Broadly, the invention consists of a circular plate or disc having a hub carrying on each end a flange, one of which mounts on the face plate of a lathe or coil winding machine while the other flange carries the conventional group winding head. The plate is apertured to receive a spring biased tube which, in turn, is provided with longitudinally spaced, diametrical apertures for the reception of a rod which prevents displacement of coils deposited on the tube while companion coils are being successively formed on the head with the same strand of wire.

Other objects will appear as the description proceeds when considered with the annexed drawing, wherein:

Figure 1 is a side elevational view of a conventional coil winding machine showing the invention interposed between the machine and the conventional group winding head.

Figure 2 is a side elevational view of the invention per se on a slightly larger scale.

Figure 3 is a rear elevational view of the invention, and

Figure 4 is a front elevational view thereof.

Continuing with a more detailed view of the drawing reference numeral 10 denotes generally a conventional coil winding machine whose head stock spindle 11 is driven in the usual manner through the medium of a motor 12, drive shaft 13, pulleys 14 and belt 15. The spindle 11 carries the conventional face plate 16 provided with under cut grooves 17 which slidably receive the heads of work holding bolts 18.

The invention is comprised of a circular plate 19 having a hub 20 which is preferably made integral with the plate. One end of the hub 20 is provided with an integral rear flange 21, provided with diametrically opposed slots 22 which extend inwardly from the perimeter of the flange toward its center. These slots receive the work holding bolts 18 by which the coil holding attachment is secured to the face plate 16.

On the opposite end of the hub 20 of the plate 19 is an integral front flange 23 having diametrically opposed holes 24 for the reception of bolts 25 which secure to the front flange 23 the flange 26 of a conventional coil winding head generally indicated by reference numeral 27, to which further reference will be made presently.

The plate 19 has a transverse opening 28 adjacent its perimeter through which extends a tube or pin 29 having, on its rear end, a head 30. A coil spring 31 surrounds the pin 29, bearing at one end against the head 30 and at its opposite end against the rear face of the plate 19, thus to hold the pin 29 retracted. A stop pin 32 (Figure 2) extends diametrically through the pin 29, limiting rearward displacement of the latter to prevent its contact with the face plate 16.

Arranged in longitudinally spaced relationship in the forwardly extending portion of the pin 29 is a series of diametrical holes 33, the spacing of which is such as to accommodate therebetween a completed coil 34. To prevent the completed coils from being thrown from the pin 29 as the plate 19 revolves, a dowel 35 is passed through an opening 33 forwardly of the foremost coil supported on the pin or coil holder 29. Also, as the plate revolves, there is a tendency for the coils to swing outwardly by centrifugal force and to prevent this, a stop pin 36 is anchored in the face of plate 19 and extends forwardly so that the coils will be brought up against the pin and thus limit their outward swinging displacement.

The winding head 27 is of well known design and construction and is composed of two half cone sections 37 having corresponding annular grooves 38 of gradually increasing diameter for the winding of coils of different sizes. The usual practice is to individually wind the required number of coils for a given job in grooves 38 of different diameters, removing a completed coil before starting another. As each coil is completed, the two head sections 37, which are normally expanded, are collapsed or brought together to allow the coil to be removed from the selected groove of the head. The completed coil is then suspended on the holder pin 29 in the manner described earlier and another coil from the same strand of wire is started in the same groove of the head. This operation is repeated by winding coils in progressively smaller grooves 38 until the required number of coils has been completed and suspended in nested relationship on the holder 29.

Figure 1 shows, by way of example, three coils being wound in progressively smaller grooves of the head 27 from the same strand of wire. While it is possible to wind several coils of different diameters simultaneously on the head, it is preferred, as pointed out above to remove each coil as it is completed and suspend the same on the holder pin 29 without cutting the wire with which subsequent coils are formed.

It is evident from the foregoing that the work of winding several coils is greatly facilitated since the holder revolves at the same speed as the head and carries with it the completed coils, making it unnecessary to wind each coil separately.

Manifestly, the construction as shown and described is capable of some modification and such modification as may be construed to fall within the scope and meaning of the appended claims is also considered to be within the spirit and intent of the invention.

What is claimed is:

1. In combination with a coil winding machine and its winding head, a coil holder comprising a plate having a hub, a rear flange on one end of said hub adapted to be secured to the face plate of said winding machine, a front flange on the opposite end of said hub to which said winding head is secured, a transverse pin slidably mounted in said plate and spring biased rearwardly thereof, said pin protruding forwardly of said plate to receive coils completed on said winding head and means for holding said coils on said pin as said head and plate are rotated.

2. In a coil holder for a coil winding machine, the combination with the winding head of said machine of a plate interposed between said machine and winding head to revolve with the latter, a pin extending slidably through an aperture in said plate adjacent its perimeter on which coils are successively disposed as they are completed on said winding head, said pin having a series of longitudinally spaced transverse apertures therein, a dowel selectively receivable in said aperture forwardly of the foremost coil on said pin to preclude release of said coils from the forward end of said pin and means normally biasing said pin rearwardly in said plate to clamp said completed coils between said plate and said dowel.

3. The structure of claim 2, and means carried by said plate for holding the coils on said pin against outward swinging displacement during rotation of said plate and said head.

References Cited in the file of this patent

UNITED STATES PATENTS

| | | |
|---|---|---|
| 1,379,755 | Francis | May 31, 1921 |
| 2,140,137 | Merkle | Dec. 13, 1938 |